(12) United States Patent
Greiner et al.

(10) Patent No.: US 12,551,170 B2
(45) Date of Patent: Feb. 17, 2026

(54) PROVIDING A VISUAL REPRESENTATION OF PATIENT MONITORING DATA

(71) Applicant: KONINKLIJKE PHILIPS N.V., Eindhoven (NL)

(72) Inventors: Harald Greiner, Nufringen (DE); Frank Enslin, Deckenpfronn (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 615 days.

(21) Appl. No.: 17/767,637

(22) PCT Filed: Sep. 22, 2020

(86) PCT No.: PCT/EP2020/076344
§ 371 (c)(1),
(2) Date: Apr. 8, 2022

(87) PCT Pub. No.: WO2021/069202
PCT Pub. Date: Apr. 15, 2021

(65) Prior Publication Data
US 2023/0140188 A1 May 4, 2023

(30) Foreign Application Priority Data

Oct. 9, 2019 (EP) .................................. 19202153

(51) Int. Cl.
*A61B 5/00* (2006.01)
*G16H 40/40* (2018.01)

(52) U.S. Cl.
CPC ............ *A61B 5/742* (2013.01); *A61B 5/0022* (2013.01); *G16H 40/40* (2018.01)

(58) Field of Classification Search
CPC ........ G16H 40/40; A61B 5/742; A61B 5/0022
See application file for complete search history.

(56) References Cited

U.S. PATENT DOCUMENTS

2013/0157571 A1* 6/2013 Wondka ............ H04W 52/0245
455/41.2
2013/0162426 A1 6/2013 Wiesner
2016/0341799 A1* 11/2016 Peeters .............. G01N 33/0009
2019/0373114 A1* 12/2019 Gullander ......... H04M 1/72454

OTHER PUBLICATIONS

International Search Report for PCT/EP2020/076344 Filed Sep. 22, 2020 and Dated Dec. 3, 2020.

* cited by examiner

*Primary Examiner* — Steven G.S. Sanghera

(57) ABSTRACT

A patient monitor and a separate user interface for the patient monitor, adapted to communicate with one another over a communication pathway. Both the patient monitor and the separate user interface are able to independently check the status of the communication pathway, and visually indicate this status.

11 Claims, 3 Drawing Sheets

PROVIDING A VISUAL REPRESENTATION OF PATIENT MONITORING DATA

CROSS-REFERENCE TO PRIOR APPLICATIONS

This application is the U.S. National Phase application under 35 U.S.C. § 371 of International Application No. PCT/EP2020/076344, filed on Sep. 22, 2020, which claims the benefit of European Application No. 19202153.3 filed on Oct. 9, 2019. These applications are hereby incorporated by reference herein.

FIELD OF THE INVENTION

The present invention relates to the field of patient monitoring, and in particular to the handling of patient monitoring data.

BACKGROUND OF THE INVENTION

In a clinical setting, such as in an intensive care unit or neonatal intensive care unit, patient monitors are routinely used to autonomously monitor physiological data of subjects or patients. A patient monitor may be adapted to generate patient monitoring data, which may comprise the physiological data and/or data derived therefrom.

It is somewhat common for a patient monitor to generate alarm data, which indicates whether an alarm event (either physiological or technical event crucial to patient's safety) has occurred, an alarm event being an indication that a patient or the patient monitor has entered a non-desirable state. For example, an alarm event, associated with a physiological nature, may indicate a low heart-rate or $SpO_2$ level of the subject, while a technical alarm event may indicate a low battery level or malfunction of the patient monitor.

Typically, a visual representation of the patient monitoring data (and alarm data in particular) is provided by the patient monitor by a two-dimensional screen directly connected via a wire or other electrical connection to the remainder of the patient monitor, e.g. via a Video Graphics Array (VGA) cable. Indeed, this method of providing a visual representation using a direct, wired connection has generally been considered essential to ensure the patient monitor meets clinical compliance requirements (e.g. providing notification of alarm events within a clinically acceptable period or providing sufficiently up-to-date information on physiological parameters of the patient).

It is also known to provide or utilize additional user interfaces, such as a tablet or mobile phone, which receive updates from the patient monitor over a wired or wireless channel. These user interfaces supplement the two-dimensional screen of the patient monitoring device by mirroring the visual representation and/or providing additional information about the patient monitoring data. Generally, these user interfaces operate by the patient monitor pushing patient monitoring data updates to the user interface.

There is an ongoing desire to increase the flexibility and usability of a patient monitoring system. There is also a desire to reduce the number of alarms or alerts provided to a caregiver/clinician.

SUMMARY OF THE INVENTION

The invention is defined by the claims.

In accordance with an aspect of the invention, there is provided a patient monitor for generating patient monitoring data to be visually represented by a two-dimensional display screen of a user interface.

The patient monitor comprises: a communication system adapted to: transmit patient monitoring data over a communication pathway between the patient monitor and the user interface; monitor the status of the communication pathway between the patient monitor and the communication module of the user interface; and an input module adapted to obtain physiological data of a patient from one or more patient sensors; a secondary alarm module adapted to provide a user-perceptible output; a patient monitor processor adapted to: monitor the status of the patient monitor; obtain the physiological data and generate patient monitoring data responsive to the physiological data; control the user-perceptible output of the secondary alarm module responsive to the status of the communication pathway; and control the user-perceptible output of the secondary alarm module responsive to the status of the patient monitor; an audible output module controlled by the patient monitor processor, wherein the patient monitor processor is adapted to, in response to the status of the communication pathway indicating that the communication pathway is able to successfully carry the patient monitoring data and the user interface comprises an audible output module, prevent the at least one audible output module from generating any audible outputs responsive to alarm data.

According to proposed embodiment, therein provided a patient monitor that is adapted to suppress/mute/prevent audible outputs in response to the communication pathway being capable of carrying the patient monitoring data to a connected user interface that has an audible output module. Thus, audible alarms can be suppressed at the patient monitor if the user interface is able to provide an audible output (that would otherwise be provided by the patient monitor).

In particular, the patient monitor may be adapted to suppress/mute/prevent audible outputs in response to the communication pathway being capable of carrying the patient monitoring data to a connected user interface that can provide an audible output, wherein the patient monitoring data comprises alarm data.

Some clinical compliance guidelines necessitate the generation of an audible alarm in response to an alarm event (e.g. a patient's heartrate falling below a predetermined value). In such scenarios, the patient monitor may be adapted to suppress audible outputs in response to the communication pathway being capable of carrying the patient monitoring data (which comprises alarm data) and the user interface comprising a speaker adapted to provide an audible output responsive to the patient monitoring data. This enables the clinical compliance guidelines to be safely met, whilst reducing the number of audible alarms output by the patient monitor. Reducing the number of audible alarms output by the patient monitor may, for example, reduce stress or anxiety experienced by the patient (and/or nearby patients).

Audible alarms can be suppressed, prevented or stopped by the patient monitor when there is a stable connection to a user interface. This provides a quieter environment in the vicinity of the patient (as the user interface may be placed remotely), reducing patient and clinician stress, and reducing alarm fatigue for a clinician working alongside the patient. This enables more flexibility in configuring a patient monitoring system.

The proposed patient monitor also enables a communication with a user interface to take place in a reliable manner, whilst notifying a clinician of any changes in the status of the communication. Such notification enables a clinician to manually attend to the patient (i.e. to avoid the patient entering an undesirable clinical state without being noted by a patient monitor).

By checking the status of the communication pathway/channel, a secure and stable connection with the user interface can be assured. Thus, the patient monitor does not need to itself comprise a screen for providing a visual representation of the patient monitoring data to a clinician. This ability can provide a cheaper patient monitor, and enable centralization of visual representations of different patients.

The proposed patient monitor thereby enables a more flexible system, whilst also avoiding the need for the patient monitor to have its own screen for displaying patient monitoring data. Thus, the patient monitor may be "headless".

Monitoring the status of the patient monitor ensures that the patient monitor is itself reliable. Monitoring the status of the patient monitor may comprise using one or more watchdogs or watchdog timers to iteratively check or monitor whether the patient monitor has encountered an error or entered an unexpected state. The patient monitor may, in particular, be adapted to guarantee that the status of the patient monitor is supplied or otherwise indicated to the user, thereby providing a "reliable patient monitor".

The patient monitor processor may be further adapted to: monitor a status of the user interface; and control the secondary alarm module responsive to the status of the user interface.

In particular, the patient monitor may be adapted to control the secondary alarm module to be responsive to the patient monitoring data in response to determining that the user interface has failed (as indicated in the status). This ensures that patient monitoring data continues to be provided or output, even if the user interface itself fails.

In some embodiments, the patient monitor may be adapted to control the secondary alarm module to be responsive to the patient monitoring data in response to determining that the communication pathway has failed or is otherwise unable to successfully carry the patient monitoring data.

In some embodiments, the patient monitor may be adapted to control the secondary alarm module to be unresponsive to the patient monitoring data in response to determining that neither the communication pathway nor the user interface has failed.

The patient monitoring data generated by the patient monitor processor may comprise alarm data indicating the presence or absence of an alarm event indicating the patient or the patient monitor entering a non-desirable state.

In some embodiments, the patient monitor processor is adapted to, in response to the status of the communication pathway indicating that the communication pathway has failed or is otherwise unable to successfully carry the patient monitoring data, use the at least one audible output module to generate an audible output responsive to alarm data.

The patient monitor is preferably devoid of any two-dimensional screens for providing a visual representation of the patient monitoring data and/or is configured to be unable to communicate with a device having a two-dimensional screen over a wired communication pathway. This helps reduces a cost and complexity of the patient monitor, whilst ensuring that patient monitoring data is made available to view (via the user interface).

The communication system is adapted to selectively communicate with two or more different user interfaces.

Thus, in the event of a failure of a communication pathway or user interface, a new user interface may be paired or coupled with the patient monitor to enable the visual representation of the patient monitoring data to be viewed.

Of course, embodiments enable more than one user interface to view (the same or different) patient monitoring data associated with the same patient, to provide a more flexible working environment.

The communication system may be adapted to, in response to the status of the communication pathway indicating that the communication pathway has failed or is otherwise unable to carry the patient monitoring data, begin transmitting the patient monitoring data to a different user interface. This may comprise setting up a new communication pathway with a different user interface, methods of which are known in the art.

According to proposed concepts, there may be provided a user interface for providing a visual representation of patient monitoring data obtained by a patient monitor adapted to monitor physiological parameters of a patient.

The user interface comprises: a communication module adapted to: receive patient monitoring data from the patient monitor over a communication pathway between the patient monitor and the user interface; and monitor a status of the communication pathway; an output module for providing user-perceptible outputs, the output module coupleable to a two-dimensional display screen for generating a visual output; a user interface processor adapted to: monitor a status of the user interface and the display screen; obtain the patient monitoring data from the communication module; control the two-dimensional display screen to provide a visual representation of the patient monitoring data, based on the patient monitoring data; control the output module to provide a user-perceptible output indicating the status of the communication pathway; and control the output module to provide a user-perceptible output indicating the status of the user.

The proposed user interface enables a more flexible patient monitoring system. In particular, a visual representation of the patient monitoring data and delivery of the user-perceptible alarms can be provided remotely and reliably, thereby removing the need to provide a visual representation at the patient monitor itself.

Typically, for clinical compliance purposes, there is a need to ensure that a visual representation of patient monitoring data as well as delivery of any alarms triggered by physiological or technical events is reliable and represents the latest available acquisition of the patient monitoring information. The proposed user interface enables the reliability of the communication from the patient monitor to be assured, thereby meeting the clinical compliance requirements without requiring a physical connection. This improves the flexibility of an overall patient monitoring system.

In some embodiments, the user interface processor is further adapted to monitor a status of the patient monitor and control the output module to provide a user-perceptible output indicating the status of the patient monitor. This may be performed by monitoring, for example, a heartbeat signal generated by the patient monitor.

In some embodiments, the process of monitoring a status of the user interface, performed by the user interface processor, comprises using one or more watchdog timers to repeatedly check whether the user interface has encountered an error.

Monitoring the status of the user interface ensures that the user interface is itself reliable. Monitoring the status of the user interface may comprise using one or more watchdogs or watchdog timers to iteratively/repeatedly check or monitor whether the user interface has encountered an error or entered an unexpected state. The user interface may, in particular, be adapted to guarantee that the status of the user interface is supplied or otherwise indicated to the user, thereby providing a "reliable user interface". The patient monitoring data may comprise alarm data indicating the presence or absence of an alarm event indicating the patient or the patient monitor entering a non-desirable state.

The output module may comprise a speaker for generating an audio output, and the processor may be further adapted to control the speaker to provide an audio representation of the patient monitoring data (for example, when an alarm related to a physiological event is triggered) and/or the status of the communication pathway.

An audio output of the patient monitoring data (e.g. alarm data) may be a requirement to meet some clinical compliance guidelines. By providing an audio output at the (remote) user interface, the audio outputs at the patient's location (at the patient monitor) can be muted, suppressed or otherwise stopped. This enables a quieter environment in the vicinity of the patient, decreasing patient stress, reducing distractions for a clinician and (where patient monitoring data comprises alarm data) reducing alarm fatigue of a clinician in the vicinity of the patient.

The communications module may be adapted to monitor the status of the communication pathway by iteratively checking a presence of a bio-directional link provided by the communication pathway, wherein the duration between iterative checks is no less than 3 seconds.

Performing such an iterative check may increase a compliance of the overall patient monitoring system with clinical guidelines. In particular, such a regular check can ensure that either patient monitoring data is updated at sufficient intervals for clinician monitoring purposes or that the clinician is alerted to errors in communication (e.g. so that they can then manually check the patient's status). This reduces a likelihood that a patient will enter a clinically non-desirable state for a prolonged period without the clinician (observing the user interface) noticing.

The communication module may be adapted to selectively communicate with two or more different patient monitors.

In another embodiment the user interface further includes a two-dimensional display screen being a part of the output module, for example.

According to examples in accordance with another aspect of the invention, there is provided a patient monitoring system comprising at least one user interface, as herein described, and at least one patient monitor as herein described.

Having both the user interface and the patient monitor check the status of themselves and the communication pathway ensures that an end-to-end reliability check is performed. This means that the overall patient monitoring system is reliable, by ensuring that any errors in presenting the patient monitoring data to a user (e.g. during generation of the patient monitor data at the patient monitor, during communication of this data to the user interface or during the display of the patient monitoring data) are alerted to the user.

This reduces the chances of a patient entering a clinically undesirable state or a medical equipment malfunctioning without the user noticing, e.g. as the user may be prompted to manually check the patient monitor if the patient monitoring system has failed.

According to examples in accordance with another aspect of the invention, there is provided a method of providing, using a patient monitor comprising a secondary alarm module adapted to controllably generate a user-perceptible output, patient monitoring data to a user interface for display.

The method comprises: obtaining, from one or more patient sensors, physiological data of a patient; generating patient monitoring data responsive to the physiological data; transmitting patient monitoring data over a communication pathway to a user interface; monitoring the status of the communication pathway; monitoring the status of the patient monitor; controlling the user-perceptible output of the secondary alarm module responsive to the status of the communication pathway; controlling the user-perceptible output of the secondary alarm module responsive to the status of the patient monitor; determining whether the user interface comprises an audible output module; and in response to the status of the communication pathway indicating that the communication pathway is able to successfully carry the patient monitoring data and the user interface comprises an audible output module, prevent the audible output module of the patient monitor from generating any audible outputs responsive to alarm data.

There is also provided a method of displaying, at a user interface coupleable to a two-dimensional screen, patient monitoring data obtained by a patient monitor. The method comprises: receiving patient monitoring data from the patient monitor over a communication pathway; controlling the two-dimensional display screen to provide a visual representation of the patient monitoring data, based on the patient monitoring data; monitoring the status of the communication pathway between the patient monitor and the user interface; monitoring the status of the user interface and the two-dimensional display screen; controlling the output module to provide a user-perceptible output indicating the status of the communication pathway; and controlling the output module to provide a user-perceptible output indicating the status of the user interface.

According to examples in accordance with another aspect of the invention, there is provided a computer program comprising code means for any herein described method when said program is run on a processing system.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
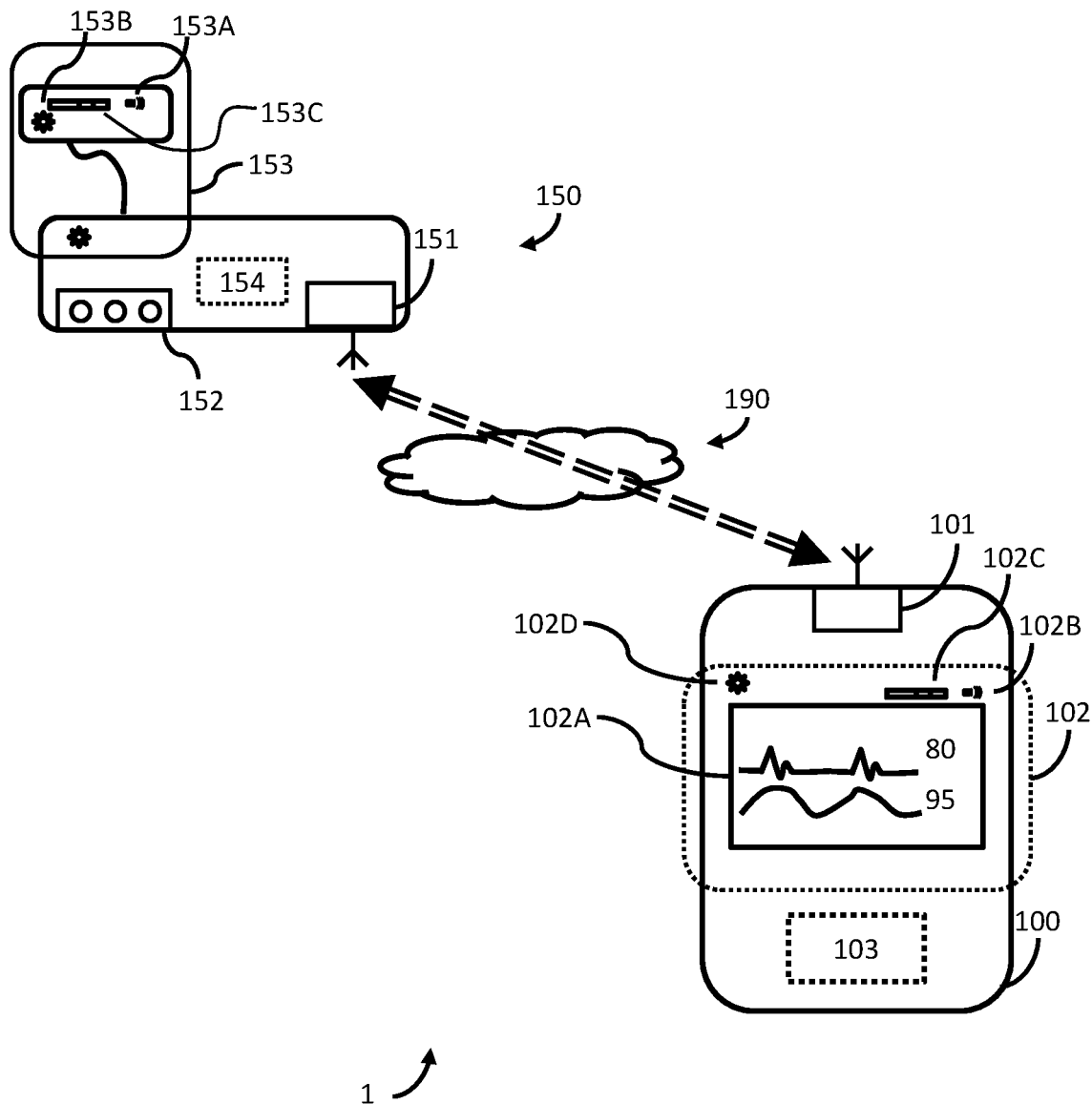
FIG. 1 illustrates a patient monitoring system comprising a patient monitor and a user interface according to an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a new and flexible concept for patient monitoring systems that negates the need for displays and/or alarm systems in the vicinity of a patient. This inventive concept is achieved using two interrelated products, namely a patient monitor and a separate user interface(s) for the patient monitor. The patient monitor and separate user interface(s) are adapted to communicate with one another over a communication pathway. Both the patient monitor and the separate user interface(s) are able to independently check the status of themselves and of the communication pathway, and visually indicate the results of the status check. This helps ensure that there is not only a reliable connection between patient monitors and user interfaces but also an up to date information on "wellbeing" of each of the devices, to help ensure that clinical compliance guidelines are met.

Embodiments may be used in a clinical environment in which (automated) patient monitoring takes place, such as in a ward or intensive care unit.

FIG. 1 illustrates a patient monitoring system 1 according to an embodiment of the invention. The patient monitoring system comprises a user interface 100 and a patient monitor 150.

The user interface 100 represents one embodiment of the inventive concept, the patient monitor 150 represents another embodiment of the inventive concept, and the patient monitoring system 1 represents yet another embodiment of the inventive concept.

The user interface comprises 100 comprises a communication module 101, an output module 102, comprising a user interface processor 103 and preferably a two-dimensional display screen 102A. The user interface is adapted to provide on the display screen a visual representation of patient monitoring data obtained by the patient monitor.

Though the output module is illustrated as having a display screen 102A being an integral part of said module, it shall be understood by a skilled in the art person that the user interface 100 comprising the output module 101 can be in form of a separate unit and be coupled to an external display screen.

The user interface 100 may be any device able to communicate and display patient monitoring data on a two-dimensional display screen, such as a mobile phone, a tablet, a laptop, a computer, a smartwatch, smart glasses and so on.

The patient monitor 150 comprises a communication system 151, an input module 152, a secondary alarm module 153 and a patient monitor processor 154. The patient monitor 150 is adapted to monitor one or more physiological characteristics of the patient and generate patient monitoring data, to be visually represented by the user interface.

The operation of the user interface 100 and the patient monitor is controlled by the user interface processor 103 and the patient monitor processor 154 respectively, as would be known to the skilled person.

The user interface 100 and the patient monitor 150 communicate with one another, by at least the patient monitor 150 transmitting patient monitoring data to the user interface 100. In particular, the communication module 101 of the user interface 100 is adapted to receive communications/signals (comprising patient monitoring data) from the patient monitor 150 and the communication system 151 of the patient monitor 150 is adapted to transmit communications (comprising patient monitoring data) to the user interface 100.

Preferably, communications between the user interface 100 and the patient monitor 150 are bi-directional, i.e. the user interface is able to provide an input to the patient monitor and vice versa. For example, upon user's selection the user interface 100 may be adapted to control a visual representation of the acquired physiological data in a form of waveforms. Depending on the user's professional skills (doctor or a nurse) it might be beneficial to present physiological waveforms in different order or arrangements on a display screen. Further, the user interface may enable the user to change thresholds triggering physiological alarms at the patient's side.

Preferably, for improved flexibility, the communication pathway is a wireless communication pathway. The user interface 100 and the patient monitor 150 may therefore communicate with one another wirelessly, by at least the patient monitor 150 wirelessly transmitting patient monitoring data to the user interface 100.

Generally speaking, the communication pathway may be a potentially unreliable communication pathway, e.g. relying upon components outside the control of the provider/operator of the user interface and/or the patient monitor.

A communication pathway is considered to be wireless if at least part (e.g. some or all) of the communication pathway (over which the communication takes place) between the patient monitor and the user interface takes place over a wireless channel.

Any suitable wireless communication protocols or technologies may be used in such embodiments. Suitable wireless communication protocols that the patient monitor and user interface may use to communicate include an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

Communications over the communication pathway, between the patient monitor and the user interface, may be encoded or formatted using the medical device data language (MDDL) or by establishing a Transmission Control Protocol (TCP) link between the patient monitor and the user interface. Other suitable methods of encoding or formatting data would be apparent to the skilled person.

Preferably, the communication pathway provides a direct communication link between the patient monitor and the user interface, e.g. using a near-field communication (NFC), Bluetooth or ZigBee protocol. In other embodiments, the communication pathway is a personal or local area network such as those that can be established using WiFi technology (but does not comprise a wide area network). In yet other embodiments, the communication pathway comprises a wide area network, e.g. the internet.

Communications, from the patient monitor to the user interface, include patient monitoring data generated by the patient monitor (examples of which will be given later). Such communications may thereby enable the patient monitor to effectively stream patient monitoring data to the user interface.

The (user interface processor 103 of the) user interface 100 obtains the patient monitoring data and controls the screen 102A to display a visual representation of the patient monitoring data (in the form of waveforms and numerical representation, for example). One example of a suitable visual representation is illustrated in FIG. 1.

In some examples, the output module 102 further comprises a speaker 102B for generating an audio output. The processor 103 of the user interface 100 may control the speaker 102B responsive to the patient monitoring data (although the speaker may instead or additionally be used for other purposes, set out below). Of course, the speaker may be controlled via an I2S interface, digital audio path, digital-to-analog converter (DAC), amplifier and so forth.

The patient monitoring data is responsive to at least physiological data of the patient, but may also be responsive to other parameters or variables. By way of example, patient monitoring data may be responsive to a status of the patient monitor or physiological/patient sensors in communication with the patient monitor.

Methods of generating patient monitoring data would be well known to the skilled person. Typically, such methods comprise receiving, at an input module 152, one or more physiological data streams/signals from a patient sensor (not shown), such as a heart-rate monitor, a pulse oximeter and so on. The (processor 154 of the) patient monitor 150 is adapted to receive such information and generate patient monitoring data for display (in the form of waveforms, for example).

In some embodiments, the patient monitor 150 may itself comprise one or more patient sensors (not shown) for directly obtaining physiological data of the patient, e.g. comprise one or more of: a camera, a heart rate monitor, a respiration rate monitor, a pulse oximeter, a blood pressure monitor and so on.

The patient monitoring data may comprise, for example, physiological information of the patient (e.g. heart rate, respiratory rate, $SpO_2$ level, temperature, urine output and so on). Physiological information may, for example, comprise information on any vital sign of the patient, any other sign/symptom of the patient or any other measureable quantity of the patient or of treatment devices provided to the patient (such as an amount left in an IV drip or a current battery level of a pacemaker).

In addition to data responsive to physiological information of the patient, the patient monitoring data may further comprise data responsive to a status of the patient monitor and/or any patient sensors in communication with the patient monitor. For example, the patient monitoring data may comprise an indication of whether or not an electrode (e.g. for monitoring a heart rate) is in electrical connection with a patient. Therefore, the transmitted to the user interface 100 data may include medical data of the patient (physiological data being acquired by at least one sensor), technical data related to functioning of various units of the patient monitor or coupled it; and results of the status check of the patient monitor as well as the communication pathway.

Preferably, the patient monitoring data comprises alarm data that indicates the occurrence or presence of alarm events.

As previously explained, an alarm event is an indication that a patient or the patient monitor has entered a non-desirable state. For example, an alarm event may indicate a low heart-rate or $SpO_2$ level of the subject, a low battery level, a disconnected lead or a malfunction of the patient monitor. In particular, an alarm event may occur if a measured level of a physiological parameter cross a predetermined threshold (e.g. goes above a maximum threshold or goes below a minimum threshold).

It is clear that methods of generating alarm data would be readily apparent to the skilled person, e.g. by comparing values of obtained physiological data to one or more thresholds or by receiving interrupts from elements of the patient monitor.

In such examples, the user interface 100 may display a visual representation of an alert (e.g. a red light or an alert symbol such as an exclamation mark) on the screen 102A when an alarm event is detected in or transmitted with the received patient monitoring data. In embodiments in which the user interface comprises a speaker 102B for generating an audio output, the processor may control the speaker to generate an audio alert responsive to an alarm event (e.g. a rapid beeping or continuous beep if an alarm event occurs or silence if no alarm event occurs). In some examples, the output module 102 further comprises a dedicated alarm light output 102C, which may visually indicate the occurrence of an alarm event (i.e. separately from the screen 102A), to aid in providing a distinguishing identification of an alarm event.

The patient monitoring data is formatted so that it is suitable for being handled by the user interface processor so that a visual representation of the patient monitoring data can be provided.

For example, the patient monitoring data may be formatted as raw data (e.g. raw physiological data or raw alarm events) for being processed into a visual representation by the user interface processor. In such embodiments, the user interface may be adapted to receive the patient monitoring data and generate display data for controlling the two-dimensional screen to provide a visual representation of the patient monitoring data.

In other examples, the patient monitoring data may be formatted as display data such as waveforms and numerics (being data that defines a visual representation on a two-dimensional display screen). This allows the patient monitor 150 to control the appearance of the visual representation provided by the user interface 100 on its screen 102B. This reduces a processing power required by the user interface 100.

In this way, the patient monitor 150 defines the visual representation displayed by the screen of the user interface, so that the visual representation provides information on the patient monitoring data.

Both the user interface 100 and the patient monitor 150 are adapted to independently monitor the status of the communication pathway 190 between the user interface 100 and the patient monitor 150.

In particular, they may be adapted to independently determine whether or not the communication pathway has failed and/or whether or not the communication pathway is incapable of successfully carrying/streaming the patient monitoring data from the patient monitor. In other words, they each determine whether the communication pathway is sufficiently stable to carry the patient monitoring data.

Failure to carry this information may be due to, for example, the user interface 100 going out of range, the user interface failing (e.g. running out of battery) or the communication pathway having saturated bandwidth, for example too much traffic/noise (e.g. transmissions from other patient monitors within the same frequency band).

In preferred embodiments, the user interface and the patient monitor may be adapted to determine whether the communication pathway is able to successfully carry the patient monitoring data from the patient monitor to the user interface within a predetermined time period, thereby determining the status of the communication pathway. The length of this predetermined time period is preferably no less than an allowable delay for generating a user-perceptible alarm in response to a non-desirable state of the patient, e.g. according to clinically acceptable guidelines. For example, the length of this predetermined time period is preferably less than 3 seconds, and may be in the region of 0.1 to 3 seconds, e.g. 0.1 to 2 seconds or 0.1 to 1 second.

The user interface 100 monitors the status of the communication pathway 190 using the communication module. The patient monitor 150 monitors the status of the communication pathway 190 using the communication system.

Methods of monitoring the status of a communication pathway would be known to the skilled person, and depend upon the type, structure, format or protocol of the communication pathway.

By way of a simple example, a status of the communication pathway may be checked by initiating a handshake protocol or "pinging" the other device in the communication pathway. A response from the other device may be checked (e.g. a lag in the communication pathway may be checked) and used to determine the status of the communication pathway.

In another example, a certain communication protocol may comprise transferring (a certain amount of) information at periodic intervals. The status of the communication may be checked by determining whether information has been received within the periodic interval, wherein a missed communication indicates a deterioration of the communication pathway, i.e. a change in status.

In yet another example, a communication protocol may comprise timestamping communications (e.g. from the patient monitor to the user interface or vice versa). The status of the communication pathway may be checked by determining whether a timestamped communication has been received within a predetermined period of time (since the timestamp), which may be the expected length of time for a communication to take place. Failure to receive the communication within the predetermined time period may indicate a deterioration of the communication pathway, i.e. a change in status.

Both the user interface 100 and the patient monitor 150 are also adapted to monitor a status of themselves. Thus, the user interface 100 monitors a status of the user interface 100, the display screen it is coupled to and the patient monitor monitors a status of the patient monitor 150. Thus, the (processors of the) user interface 100 and the patient monitor 150 are adapted to also independently monitor their own functionality (e.g. checking battery levels, software errors, output module status and the like).

In some examples, the patient monitor 150 may be adapted to check whether there have been any errors in the generation and transmittal of the patient monitor data, i.e. whether the patient monitoring data is reliably generated and transmitted. Similarly, the user interface 100 may be adapted to check whether there have been any errors in the receiving and displaying of the patient monitoring data at the screen (e.g. from receiving the patient monitoring data to displaying the patient monitoring data).

The advantage of the present solution is enabling any display screen with the user interface functionality. Normally, display screens of the patient monitors need to comply with strict medical requirements, wherein their visualization capabilities (contrast, active pixels, etc) need to be operational 24/7 for months if not years. This requirement drives a prize of the patient monitoring system. The present invention advantageously provides an alternative solution, which allows rather than imposing the strict requirement on the display screen, wherein the physiological data are monitored to provide the user interface with the self check status functionality. This self check status functionality also includes monitoring of the display's visual performance, which informs the user as soon the display's quality degrades below the medically imposed threshold.

Methods of monitoring a status of, i.e. detecting the occurrence of errors within, an electronic device (such as the user interface and the patient monitor) are well known to the skilled person.

The present invention allows any device having a display screen as well as a speaker to become an active device for alarm management of a patient as long the user interface assures a reliable functionality of the separate units it is coupled to such as either a display and/or speaker.

In particular examples, a software and/or hardware watchdog, such as a watchdog timer, may be used to monitor the status of the electronic device. A watchdog operates so that it can be guaranteed that an indication of a status can be provided. In particular, the presence or absence of errors can be detected. A watchdog thereby ensures that an electronic device is reliable. In particular, a watchdog may operate in a "fail-safe" mode, so that failure of a system or electronic device can be noticed by an operator of the device.

Some methods of monitoring a status of an electronic device may comprise monitoring the status of an output module, e.g. a speaker or audible output module. Failure of an output module may indicate a failure of the electronic device.

By way of example only, one status monitoring method may comprise controlling the speaker or audible output module to provide an inaudible test signal, so that a measuring circuit can obtain a magnitude of the signal at the test signal frequency. This magnitude can be used to gain knowledge about the functionality/status of the speaker or audible output module and its electrical connection to the host device (i.e. the user interface or the patient monitor).

In particular, a measuring circuit may be adapted to measure an alternating current in a signal path of the audible output module. This allows easy measurement of the test signal in the circuit of the audible output module, e.g., by a shunt resistor. Alternatively, the audible output may be measured by other means e.g. with a microphone or an optical sensor or indirectly by measuring the supply current of the audible output module.

This enables the status of the speaker or audible output module to be accurately assessed, potentially forming an aspect of monitoring the status of the overall user interface or patient monitor.

In some examples, the inaudible test signal may be added on top of the normal audio signal of the speaker or audible output module. In this way, the normal audio signal is not influenced and the environment is not disturbed by the inaudible test signal.

A measuring circuit may be adapted to measure an alternating current in a signal path of the audible output module. This allows easy measurement of the test signal in the circuit of the audible output module, e.g., by a shunt resistor. Alternatively, the audible output may be measured by other means e.g. with a microphone or an optical sensor or indirectly by measuring the supply current of the audible output module.

The skilled person would appreciate that other output modules may be monitored in a similar manner when monitoring a status of the user interface or patient monitor. For example, by monitoring a voltage drop across an output element (e.g. to detect if the output element has been short-circuited).

Both the user interface 100 and the patient monitor 150 are adapted to control one or more user-perceptible outputs (e.g. a visual, audible or haptic output) responsive to the independently determined status of the communication pathway and the independently determined status of themselves.

The user interface 100 indicates the status of itself and the communication pathway using the output module 102, e.g. via the two-dimensional display screen 102A, the (optional) speaker 102B, and/or a dedicated light output 102D (which forms an optional part of the output module 102).

Indicating the status of the communication pathway may comprise, for example, providing no user-perceptible output (e.g. no audible output or no visual representation) if the communication pathway is sufficiently stable to carry the patient monitoring data; and providing a user-perceptible output (e.g. an audible output or the presence of a certain visual representation) if the communication pathway is determined to not be sufficiently stable to carry the patient monitoring data.

In other words, at least one user-perceptible output is controlled responsive to the status of the communication pathway.

Similarly, indicating the status of the user interface 100 may comprise providing no user-perceptible output if the user interface has completely failed (e.g. lost power), providing a first user-perceptible output (e.g. a green light or no audible sound) if no errors are detected and/or providing a second user-perceptible output (e.g. a red light or an audible sound) if at least one error is detected.

The user interface may be adapted to operate in a "fail-safe" mode, in which failure of the user interface is notified to the skilled person. For example, the user interface may be adapted to provide a user-perceptible output if there are no errors detected, and provide no user-perceptible output if an error is detected. Thus, the complete failure of the user interface can be notified to a user (e.g. as no user-perceptible output will be provided).

Other methods of indicating a status, and suitable modules for providing a user-perceptible output of the same, would be apparent to the skilled person.

The patient monitor 150 indicates the status of the communication pathway and the status of the patient monitor 150 using the secondary alarm module 153 in a similar manner, which may provide one or more of a visual, audible or haptic output. Preferably, the secondary alarm module is, or comprises, a speaker, to avoid the need for the patient monitor 150 to have a screen. The secondary alarm module 153 may be coupled the patient monitor processor 154 and have an additional functionality of a general alarm module (arranged to provide user-perceived physiological and/ot technical alarms) of the patient monitor.

By way of example, the secondary alarm module may comprise a speaker 153A for generating an audible alert. In another example, the secondary alarm module 153 may comprise a dedicated visible output (e.g. a lamp) 153B for generating a visual alert.

Indicating the status of the communication pathway may comprise, for example, providing no user-perceptible output (e.g. no audible output or no visual representation) if the communication pathway is sufficiently stable to carry the patient monitoring data; and providing a user-perceptible output (e.g. an audible output or the presence of a certain visual representation) if the communication pathway is determined to not be sufficiently stable to carry the patient monitoring data.

Similarly, indicating the status of the patient monitor 100 itself may comprise providing no user-perceptible output if the patient monitor has completely failed (e.g. lost power), providing a first user-perceptible output (e.g. a green light or no audible sound) if no errors are detected and/or providing a second user-perceptible output (e.g. a red light or an audible sound) if at least one error is detected.

The control of the user-perceptible output(s) is performed by the respective processors of the user interface 100 and the patient monitor 150.

In embodiments in which the output module 102 further comprises a speaker 102B, the processor may be further adapted to control the speaker to provide an audio representation of the status of the communication pathway.

A visual output of the status of the communication pathway may, for example, provide no visual representation if the status of the pathway is acceptable and provide a visual representation (e.g. a light or alert symbol) if the status of the pathway is not acceptable.

By way of example, a visual output of the status of the communication pathway may comprise presenting, via the screen, a visual representation of the status at a (upper, lower, left or right) side of the visual representation of the patient monitoring data.

By way of example only, detection of a non-desirable communication pathway may trigger the generation of a technological alarm (Inop), which may act as an interrupt. This technological alarm may, in turn, trigger the provision of a user-perceptible output, e.g. an audible alarm, a visual alarm and so on, as appropriate.

The user interface and the patient monitor may be adapted to check the status of the communication pathway no less than once every 0.1 to 3 s. In particular embodiments, the allowable duration between checks of the status of the communication pathway may be no less than an allowable delay for generating a user-perceptible alarm in response to a non-desirable state of the patient, e.g. according to clinically acceptable guidelines.

In other words, indicating the status of the communication pathway and either the user interface or the patient monitor may be in the form of an audible, visual or haptic output signal, in a similar manner to indicating the status of the communication pathway.

In some embodiments, the patient monitor 150 is adapted to control or contact other modules, such as a paging system or a central controller communication system, responsive to the determined status of the communication pathway and/or its own functionality. For example, the patient monitor may control a paging system responsive to a determined status of the pathway (e.g. to send a page or signal to user devices if the pathway fails) or alert a central monitoring system responsive to the determined status.

The monitoring of the communication pathway independently performed by the user interface 100 and the patient monitor 150 effectively provides a "watchdog" communication pathway functionality to both elements.

Providing such a watchdog functionality to the communications between the user interface and the patient monitor means that a stable and secure connection between the two devices can be established and assured (with any errors in the connection being alerted to a user). This enables the suppression of user-perceptible outputs (e.g. audio alerts) at the patient monitor or by an entity in physical connection (i.e. in the vicinity of) the patient monitor.

Accordingly, in some embodiments, the patient monitor is adapted to suppress/mute/prevent audible outputs in response to the communication pathway being capable of carrying the patient monitoring data to a connected user interface. Thus, audible alarms can be suppressed at the patient monitor if the user interface is able to provide information on the data that would trigger the audible output.

In particular, the patient monitor may be adapted to suppress/mute/prevent audible outputs in response to the communication pathway being capable of carrying the patient monitoring data to a connected user interface, wherein the patient monitoring data comprises alarm data.

Some clinical compliance guidelines necessitate the generation of an audible alarm in response to an alarm event (e.g. a patient's heartrate falling below a predetermined value).

In such scenarios, the patient monitor may be adapted to suppress audible outputs in response to the communication pathway being capable of carrying the patient monitoring data (which comprises alarm data) and the user interface comprising a speaker adapted to provide an audible output responsive to the patient monitoring data. This enables the clinical compliance guidelines to be safely met, whilst reducing the number of audible alarms output by the patient monitor.

Of course, the patient monitor 150 may be adapted to provide audible outputs (responsive to alarm data) in response to the communication pathway being incapable of carrying the patient monitoring data (which comprises alarm data) or the user interface not comprising a speaker adapted to provide an audible output responsive to the patient monitoring data. This enables the clinical compliance guidelines to be safely met, if the communication pathway fails, providing a suitable back-up option.

These advantages enable more flexible use cases to be supported, such as enabling caregivers to be positioned in a separate (observation) room, whilst ensuring that patient monitoring data will either be provided to them or that they will be aware if there is a failure to provide the patient monitoring data.

Similarly, the watchdog functionality enables the patient monitor to be provided without a screen or a physical connection to a screen for displaying a visual representation of the patient monitoring information. This is because the visual representation of the patient monitoring information can be reliably provided by the user interface (such reliability being guaranteed or noted by the watchdog functionality).

For improving safety, and providing a fall-back, the secondary alarm module 153 of the patient monitor may comprise a dedicated visual output system 153C (e.g. a bar of lamps) for providing information on the occurrence of an alarm.

For further improving safety, the secondary alarm module 153 may be adapted to provide a user-perceptible output (e.g. an audible alarm) responsible to patient monitoring data (thereby performing a function of the general alarm module) if the patient monitor 150 determines that the status of the communication pathway 190 is such that it is unable to carry the patient monitoring data to the user interface 100. This ensures a suitable back-up for a failure in the communication pathway (or user interface).

The user interface and the patient monitor may each be adapted to monitor a status of the other device. Thus, the user interface may be adapted to monitor a status of the patient monitor and the patient monitor may be adapted to monitor a status of the user interface.

Checking the status of the other device may be performed according to any known method of monitoring the status of another device, e.g. employing heartbeat protocols or by iteratively requesting status information from the other device. In particular, as each of the device is configured to monitor its own status, information about the status of the device may be transmitted to the other device to thereby enable the other device to monitor the status of the original device.

The user interface and the patient monitor may be further adapted to provide a user-perceptible output responsive to the monitored status of the other device. The user interface may be used output module to provide this output, and the patient monitor may use the secondary alarm module to provide this output. This improves a user's cognition of device failures.

Of course, the skilled person would appreciate that the user interface and/or the patient monitor may be adapted to perform certain steps in response to determining that the other device has failed. Such steps may be adapted from exemplary steps, previously described, that could be taken in response to determining that the communication pathway is unable to carry the patient monitoring data.

In one example, in response to determining that the user interface has failed, the patient monitor may be adapted to control a user-perceptible output responsive to the patient monitoring data. This ensures that the patient monitoring data alerts the user, even if the user interface has failed.

Thus, in some examples, the patient monitor controls the secondary alarm module responsive to the patient monitoring data if it is determined that the communication pathway has failed (is unable to successfully carry the patient monitoring data) or the user interface has failed (e.g. is unable to provide a user-perceptible output responsive to the patient monitoring data). Of course, if neither the communication pathway nor the user interface has failed, the patient monitor may be adapted to prevent the secondary alarm module from responding to the patient monitoring data.

Other steps may be analogous to previously described steps that may be performed in response to determining that the communication pathway is unable to successfully carry the patient monitoring data to the user interface.

Preferably, the patient monitor is adapted to be capable of communicating with more than one user interface, i.e. the patient monitor is preferably not tied to communicating with only a single user interface.

In some examples, the patient monitor is adapted to be capable of transmitting the same or different information representative of patient monitoring data to more than one user interface. Thus, two different user interfaces may display (on their respective screens) either a visual representation of the same patient monitoring data (e.g. substantially identical visual representations) or a visual representation of different types of patient monitoring data (e.g. a first user interface may display heartrate information, whereas a second user interface may display $SpO_2$ information). Each type of patient monitoring data may therefore reflect a portion of some overall patient monitoring data.

In some examples, the patient monitor is adapted to selectively communicate with one or more of a selection of user interfaces. This could be performed by establishing a communication pathway to more than one user interface, as is known in the art. Establishing a communication pathway between a user interface and a patient monitor may be performed according to any known "pairing" protocol, such as a wireless "pairing" protocol. Such protocols typical have the capability to connect more than one device to a single "master" device (which may bere be the patient monitor).

It will therefore be clear that a role/task of displaying a visual representation of the patient monitoring data can be shared or swapped between different user interfaces, e.g. by changing which user interfaces establish a communication pathway with the patient monitor, to which user interfaces 100 the patient monitor 150 transmits patient monitoring information and/or which patient monitoring information is associated with information transmitted to different user interfaces.

A number of suitable examples will be hereafter described. The patient monitoring system (and therefore patient monitor(s) and/or user interface(s)) may be adapted to be capable of performing any one or more of such examples.

In some examples, more than one user interface displays a visual representation of the same patient monitoring data. In such examples, the patient monitor may be adapted to transmit the same patient monitoring data to more than one user interface.

In some examples, the visual representation of the patient monitoring data is split across multiple user interfaces (e.g. a first displaying a visual representation of a first portion, a second displaying a visual representation of a second portion and so on). Of course, some user interfaces may provide a visual representation of the same portion of patient monitoring data as another. Thus, the patient monitor may transmit different instances or portions of patient monitoring data to different user interfaces.

These embodiments are particularly useful when different clinical personnel are responsible for different aspects of a patient. For example, a first portion of the patient monitoring data may correlate to cardiology information of the patient (which may be handled/viewed by a cardiology team viewing a first user interface), whereas a second portion of the patient monitoring data may correlate to respiratory information of the patient (which may be handled/viewed by a respiratory team viewing a second user interface).

In yet further examples, the visual representation of the patient monitoring data provided by a single patient monitor and alarm thresholds associated with physiological data is different for each user interface. Thus, each user interface may adapt the visualization and user-perceived alarms in accordance to a skill set of the medical practitioner observing the corresponding user interface. This would allow optimally separating actionable alarms based on their severity between the users: nurses, would be alerted on degrading patient's state, while doctors would be called in as soon as the patient's status would become dangerous to his/her life.

In some examples, only a single user interface displays (a portion of) the visual representation of the patient monitoring data, wherein the selection of the single user interface can changed or be handed over between different user interfaces.

Thus, from the foregoing it will be clear that responsibility for displaying a visual representation of (a portion of) the patient monitoring data can be handed over between different user interfaces.

Such a handover is preferably controlled so that a period of time during which no user interface provides a visual representation of the (portion of the) patient monitoring data is less than a predetermined duration. The length of this predetermined duration is preferably no less than an allowable period of time between detecting the occurrence of an alarm event and generating a user-perceptible output (e.g. according to clinical compliance guidelines). In some embodiments, the length of this duration is no less than 3 seconds, for example in the region of 0.1 seconds to 3 seconds or 0.1 seconds to 1 second.

In some examples, this could be achieved by only stopping communications to a first user interface (thereby stopping the first user interface from providing a suitable visual representation) when a communication pathway to a second, different user interface has been established (and preferably transmissions of patient monitoring data to said second user interface initiated).

In another example, this could be achieved by rapidly switching communications (of the patient monitor) between the first and second user interface, e.g. if a patient monitor is configured to only be capable of communicating with a single user interface. Other methods will be apparent to the skilled person.

Of course, it will be appreciated that a user interface 100 is also capable of communicating with more than one patient monitor 150. Thus, a user interface may be able to switch between displaying a visual representation of patient monitoring data generated by a first patient monitor to displaying a visual representation of patient monitoring data generated by a second, different patient monitor.

In some embodiments, such a switch is only performed if the patient monitor 150 is capable of communicating with another user interface (e.g. a second user interface), to ensure that a visual representation of patient monitoring data is continually displayed.

In some embodiments, a patient monitor 150 may be adapted to, in response to the status of the communication pathway indicating that the communication pathway has failed or is otherwise unable to carry the patient monitoring data (or that a connected user interface has failed), begin transmitting the patient monitoring data over a different communication pathway to a different user interface.

In this way, a patient monitor may attempt to automatically cause a different user interface to display a visual representation of the patient monitoring data in response to communications with a user interface (originally displaying such a visual representation) failing. This provides a fall-back position to ensure that the patient monitoring data continues to be provided to a clinician.

In any foregoing embodiment, it will be apparent that there is no need for a visual representation of the patient monitoring data to be provided if no patient is monitored by the patient monitoring system. This can be manually controlled.

Figure 2:
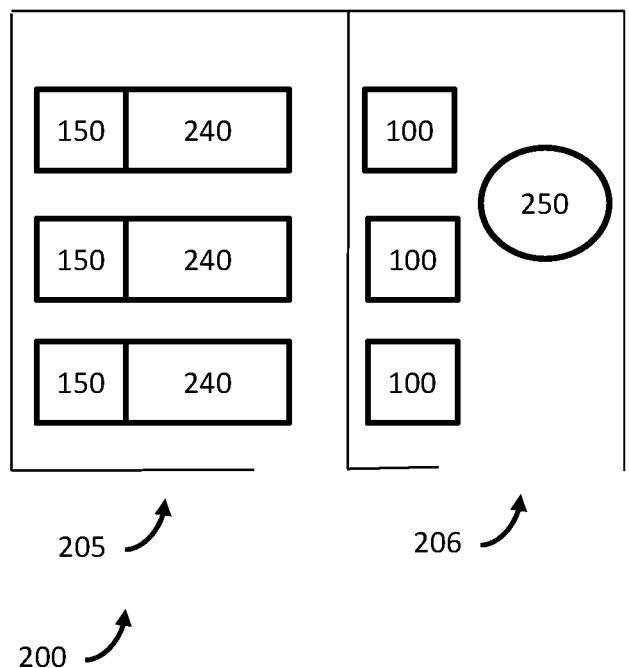
FIG. 2 illustrates a use case scenario for the patient monitoring system.

FIG. 2 illustrates a use case scenario for a patient monitoring system 200 according to an embodiment of the invention.

The patient monitoring system 200 comprises a plurality of different patient monitors 150 and a plurality of different user interfaces 100. In this illustrated scenario, each patient monitor is adapted to communicate with a single user interface, and each patient monitor is associated with a respective bed 240.

The patient monitors 150 are positioned in a first room 205 (e.g. an intensive care unit). The user interfaces 100 are positioned in a second, separate room 206 (e.g. an observation room), to which clinician 250 can be assigned.

Each patient monitor 150 communicates with a respective user interface 100, as previously described. This enables patient monitoring data, such as alarm data, to be transmitted to be a separate room 205 to the room occupied by the patient monitors. In turn, this enables alarms or other user-perceptible outputs to be suppressed at each patient monitor 150 (as this may instead be provided by the user interfaces), leading to a quieter first room 205. This can significantly reduce patient stress and/or alarm fatigue of a clinician present in the first room 205, whilst ensuring that appropriate data is still provided to a clinician 250 (present in the second room 205).

Thus, the proposed patient monitoring system can enable reduced patient stress and reduced alarm fatigue by reliably transferring patient monitoring data to a user interface, whilst ensuring that a failure to transfer patient monitoring data is notified to a user.

Figure 3:
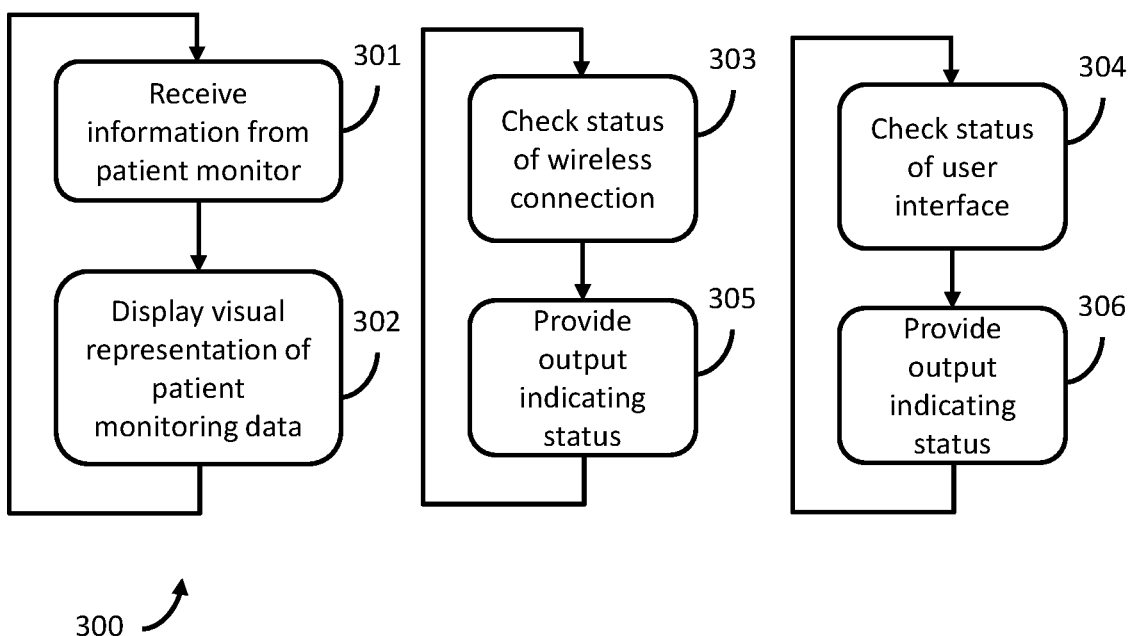
FIG. 3 illustrates a method for displaying, at a user interface, patient monitoring data obtained by a patient monitor.

FIG. 3 illustrates a method 300 performed by a user interface, comprising an output module having a two-dimensional display screen. The method 300 is for displaying, at the user interface, patient monitoring data obtained by a patient monitor The method 300 comprises a step 301 of receiving patient monitoring data from the patient monitor over a communication pathway.

The method 300 comprises a step 302 of controlling the two-dimensional display screen to provide a visual representation of the patient monitoring data, based on the patient monitoring data.

The method 300 comprises a step 303 of monitoring the status of the communication pathway between the patient monitor and the user interface.

The method 300 comprises a step 304 of monitoring the status of the user interface.

The method 300 also comprises a step 305 of controlling the output module to provide a user-perceptible output indicating the status of the communication pathway.

The method 300 also comprises a step 306 of controlling the output module to provide a user-perceptible output indicating the status of the user interface.

Steps 301 and 302 may be grouped into one procedural thread. Steps 303 and 305 may be grouped into another procedural thread. Steps 304 and 306 may be grouped into yet another procedural thread. The three procedural threads may be carried out consecutively and/or in parallel with one another.

Figure 4:
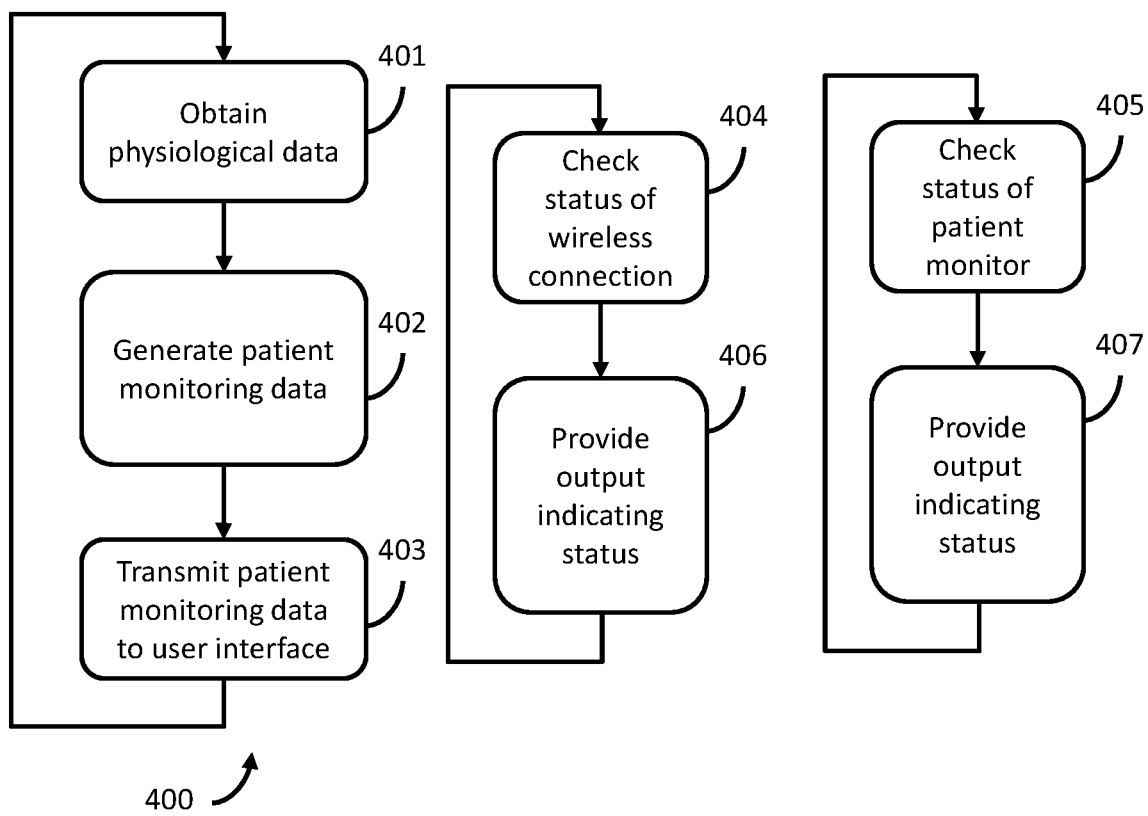
FIG. 4 illustrates another method according to an embodiment.

FIG. 4 illustrates a method 400 performed by a patient monitor, comprising a secondary alarm module adapted to controllably generate a user-perceptible output, according to an embodiment of the invention. The method is for using the patient monitor to provide patient monitoring data to a user interface for display.

The method 400 comprises a step 401 of obtaining, from one or more patient sensors, physiological data of a patient.

The method 400 comprises a step 402 of generating patient monitoring data responsive to the physiological data.

The method 400 comprises a step 403 of transmitting patient monitoring data over a communication pathway to a user interface.

The method 400 comprises a step 404 of monitoring the status of the communication pathway.

The method 400 comprises a step 405 of monitoring the status of the patient monitor.

The method 400 also comprises a step 406 of controlling the user-perceptible output of the secondary alarm module responsive to the status of the communication pathway.

The method 400 also comprises a step 407 of controlling the user-perceptible output of the secondary alarm module responsive to the status of the patient monitor.

Steps 401, 402 and 403 may be grouped into one procedural thread. Steps 404 and 406 may be grouped into another procedural thread. Steps 405 and 407 may be grouped into yet another procedural thread. The three procedural threads may be carried out consecutively and/or in parallel with one another.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system which employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the figures. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A patient monitor for generating patient monitoring data from a patient to be visually represented by a two-dimensional display screen of a user interface, the patient monitor comprising:
   a communication system adapted to:
      transmit patient monitoring data over a communication pathway between the patient monitor and the user interface;
      monitor status of the communication pathway between the patient monitor and a communication module of the user interface;
   an input module adapted to obtain physiological data of the patient from one or more physiological and/or patient sensors;
   a patient monitor processor; and
   a secondary alarm module controlled by the patient monitor processor and adapted to provide a user-perceptible output, wherein the secondary alarm module comprises a speaker at the patient monitor;
   wherein the patient monitor processor is adapted to:
      monitor status of the patient monitor;
      obtain the physiological data and generate patient monitoring data responsive to the physiological data;
      control the user-perceptible output of the secondary alarm module responsive to the status of the communication pathway;
      control the user-perceptible output of the secondary alarm module responsive to the status of the patient monitor;
      determine whether the user interface comprises a user audible output module; and
      in response to the status of the communication pathway indicating that the communication pathway is able to successfully carry the patient monitoring data and a determination that the user interface comprises the user audible output module, automatically prevent the speaker of the patient monitor from generating any audible outputs responsive to alarm data indicating an alarm event in the patient monitoring data, and transmitting the alarm data to the user interface via the communication pathway enabling the alarm to sound at the user interface via the user audible output module.

2. The patient monitor of claim 1, wherein the patient monitor processor is further adapted to: monitor a status of the user interface; and control the secondary alarm module responsive to the status of the user interface.

3. The patient monitor of claim 1, wherein the patient monitor processor is further adapted to, in response to the status of the communication pathway indicating that the communication pathway has failed or is otherwise unable to successfully carry the patient monitoring data, use the speaker to generate an audible output responsive to the alarm data.

4. The patient monitor of claim 1, wherein the patient monitor is devoid of two-dimensional screens for providing a visual representation of the patient monitoring data.

5. A patient monitoring system comprising the patient monitor according to claim 1 and the user interface for providing a visual representation of the patient monitoring data obtained by the patient monitor, the user interface comprising:
   a communication module adapted to:
      receive the patient monitoring data from the patient monitor over the communication pathway between the patient monitor and the user interface; and
      monitor the status of the communication pathway;
   an output module for providing a user-perceptible output, the output module coupleable to a two-dimensional display screen for generating a visual output; and
   a user interface processor adapted to:
      monitor a status of the user interface;
      obtain the patient monitoring data from the communication module;
      control the two-dimensional display screen to provide a visual representation of the patient monitoring data, based on the patient monitoring data;
      control the output module to provide a user-perceptible output indicating the status of the communication pathway; and
      control the output module to provide the user-perceptible output indicating the status of the user interface.

6. A method of providing, using a patient monitor comprising a speaker and a secondary alarm module adapted to controllably generate a user-perceptible output, patient monitoring data from a patient to a user interface for display, the method comprising:
   obtaining, from one or more patient sensors of the patient monitor, physiological data of a patient;
   generating patient monitoring data responsive to the physiological data;
   transmitting the patient monitoring data over a communication pathway to the user interface;
   monitoring status of the communication pathway;
   monitoring status of the patient monitor;
   controlling the user-perceptible output of the secondary alarm module responsive to the status of the communication pathway;
   controlling the user-perceptible output of the secondary alarm module responsive to the status of the patient monitor;
   determining whether the user interface comprises a user audible output module; and
   in response to the status of the communication pathway indicating that the communication pathway is able to successfully carry the patient monitoring data and a determination that the user interface comprises the user audible output module, automatically preventing the speaker of the patient monitor from generating any audible outputs responsive to alarm data indicating an alarm event in the patient monitoring data, and transmitting the alarm data to the user interface via the communication pathway enabling the alarm to sound at the user interface via the user audible output module.

7. The patient monitor of claim 1, wherein the patient monitor is configured to be unable to communicate with a device having a two-dimensional screen over a wired communication pathway.

8. The method of claim 6, further comprising:
monitoring a status of the user interface; and
controlling the secondary alarm module responsive to the status of the user interface.

9. The method of claim 6, further comprising:
in response to the status of the communication pathway indicating that the communication pathway has failed or is otherwise unable to successfully carry the patient monitoring data, using the speaker to generate an audible output responsive to the alarm data.

10. The method of claim 6, wherein the patient monitor is devoid of two-dimensional screens for providing a visual representation of the patient monitoring data.

11. The method of claim 6, wherein the patient monitor is unable to communicate with a device having a two-dimensional screen over a wired communication pathway.

* * * * *